United States Patent
Khafizov et al.

(10) Patent No.: US 9,766,939 B1
(45) Date of Patent: *Sep. 19, 2017

(54) RESOURCE OVERPROVISIONING IN A VIRTUAL MACHINE ENVIRONMENT

(71) Applicant: OPEN INVENTION NETWORK LLC, Durham, NC (US)

(72) Inventors: Farid Khafizov, Plano, TX (US); Andrey Mokhov, Moscow (RU)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,589

(22) Filed: Oct. 17, 2016

Related U.S. Application Data

(63) Continuation of application No. 13/895,052, filed on May 15, 2013, now Pat. No. 9,471,385.

(60) Provisional application No. 61/683,889, filed on Aug. 16, 2012.

(51) Int. Cl.
G06F 9/46 (2006.01)
G06F 9/50 (2006.01)
G06F 9/455 (2006.01)

(52) U.S. Cl.
CPC ........ *G06F 9/5038* (2013.01); *G06F 9/45533* (2013.01)

(58) Field of Classification Search
None
See application file for complete search history.

(56) References Cited

U.S. PATENT DOCUMENTS

2010/0199285 A1* 8/2010 Medovich ........... G06F 9/45533
718/104
2013/0275975 A1* 10/2013 Masuda ................ G06F 9/5077
718/1

* cited by examiner

*Primary Examiner* — Sisley Kim
(74) *Attorney, Agent, or Firm* — Haynes and Boone, LLP

(57) ABSTRACT

Systems, apparatuses, methods, and computer programs for overprovisioning resources are disclosed. Resource usage statistics may be gathered for a plurality of client virtual machines ("VMs"). Statistical characteristics of resource usage by the plurality of client VMs may be calculated. It may also be determined which of the plurality of client VMs requesting resources to allocate resources to, as well as an amount of the resources to allocate, in a given time slot based on the calculated statistical characteristics.

20 Claims, 16 Drawing Sheets

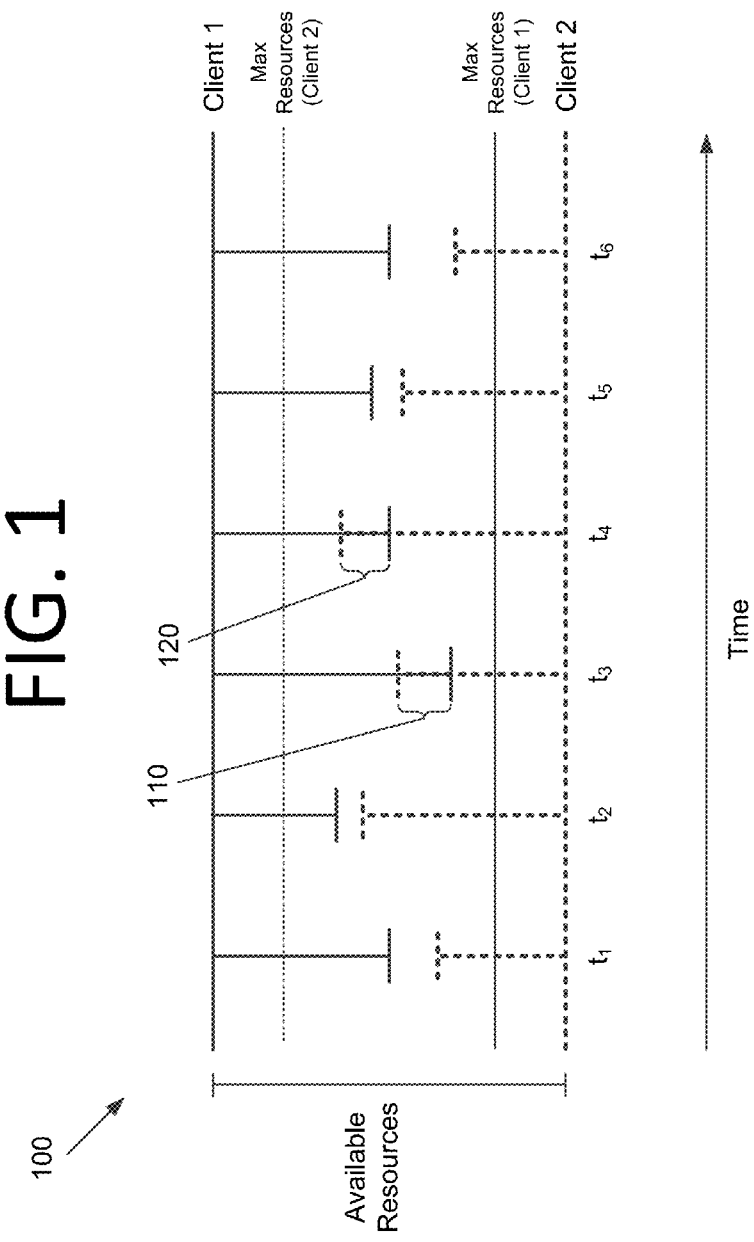

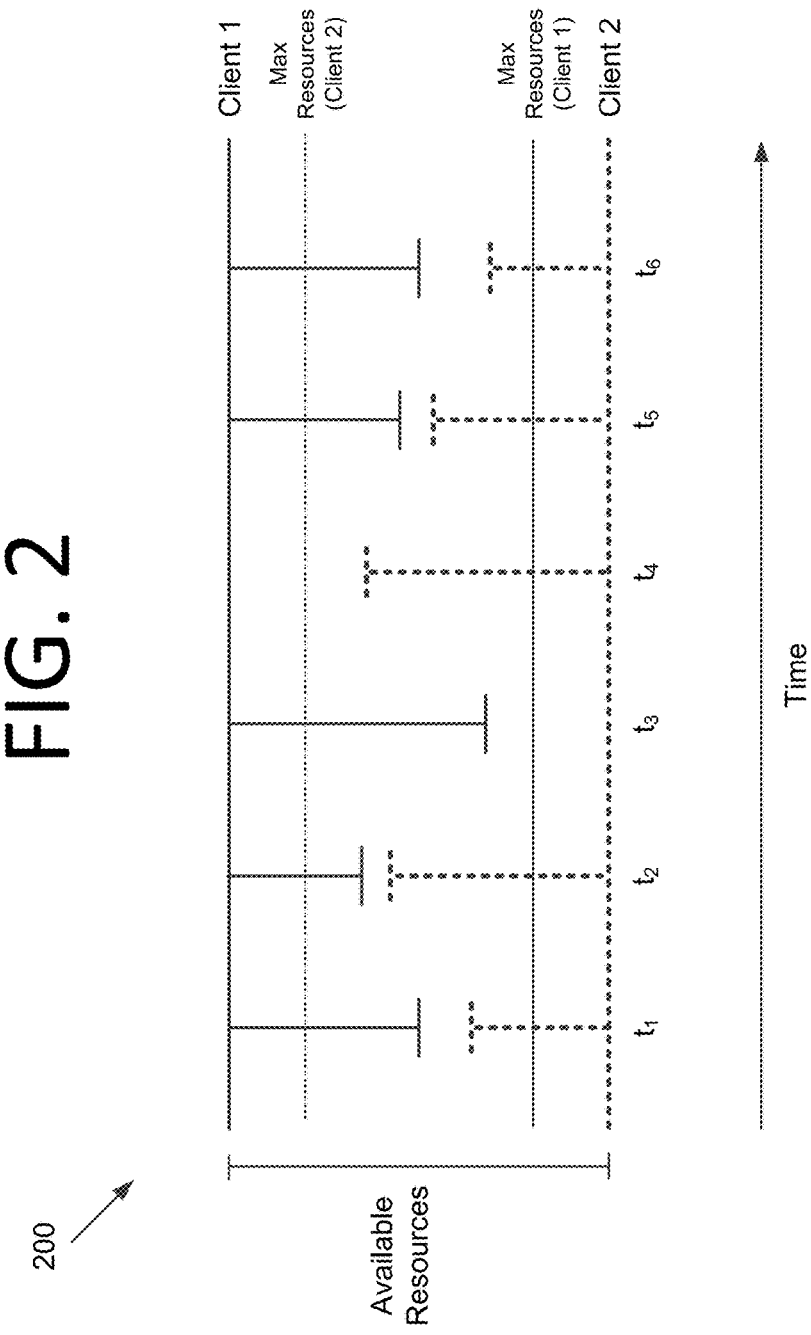

FIG. 9

RESOURCE OVERPROVISIONING IN A VIRTUAL MACHINE ENVIRONMENT

CROSS REFERENCE TO RELATED APPLICATIONS

The present application is a continuation of U.S. patent application Ser. No. 13/895,052, filed May 15, 2013, entitled RESOURCE OVERPROVISIONING IN A VIRTUAL MACHINE ENVIRONMENT, issued as U.S. Pat. No. 9,471,385 on Oct. 18, 2016, which is a non-provisional of, and claims priority to, U.S. Provisional Patent Application Ser. No. 61/683,889, filed Aug. 16, 2012, the subject matter of which is hereby incorporated by reference in their entirety.

FIELD

The present invention generally pertains to managing resources, and more specifically, to resource overprovisioning in a virtual machine environment.

BACKGROUND

In conventional virtual computing systems, resources are typically assigned to clients (e.g., guest operating systems) in such a way that the sum of individually assigned resources is larger than the actual amount of physical resources. This is called "overprovisioning." For example, a hosting resource manager ("HRM") that has 2 gigabytes ("GB") of random access memory ("RAM") in hardware may assign 1.5 GB (or even 2 GB) to each of multiple guest operating systems. Such overprovisioning is done in an attempt to increase the efficiency of resource usage.

The rationale behind overprovisioning is that most of the time, only a fraction of total available resources are being utilized by each client. Therefore, the system will often be able to satisfy resource requirements of both clients. Various methods have been proposed to effectively manage resources in a virtual computing environment. For example, a Balloon driver has been proposed by VMWare®, as discussed in U.S. Pat. No. 7,433,951. It is known (e.g., see the VMWare® white paper Understanding Memory Resource Management in VMware® ESX™ Server) that the balloon driver solution has some drawbacks when used for memory management, one of which is slow response to the client's additional memory requests.

The balloon driver is a pseudo kernel driver inside each client OS hosted by the virtual machine system. The balloon driver has a private communication channel with a hypervisor, which allows the global resource manager to manipulate the client's resources, such as memory, via commands sent to the balloon driver. In particular, this technology allows the global resource manager (i.e., the hypervisor) to reserve some of the memory originally assigned to the clients and to assign the memory to new clients, if necessary. Normally, all clients will receive all memory resources available in hardware, and then the balloon driver will request memory pages from the corresponding client OS based on commands received from the hypervisor via the private communication channel. However, the balloon driver technology is a rather slow mechanism and in some situations, may not provide much benefit. Accordingly, a more effective approach to overprovisioning resources in a virtual machine environment may be beneficial.

SUMMARY

Certain embodiments of the present invention may provide solutions to the problems and needs in the art that have not yet been fully solved by conventional overprovisioning approaches. For example, certain embodiments of the present invention, a system monitors and learns the resource usage statistics for resources used by different clients. In some embodiments, the system can estimate optimal memory allocation for the client OS within the VM system such that the need to add/revoke additional memory is minimized. Optimality is defined in terms performance characteristics of client OSs. Historical data may be collected for each client and taken into consideration. A benefit of this approach is reduced delay associated with the system's reaction to the additional memory requests from the client OSs.

In one embodiment of the present invention, a computer program is embodied on a computer-readable storage medium. The computer program is configured to cause at least one processor to gather resource usage statistics for a plurality of client virtual machines ("VMs") and calculate statistical characteristics of resource usage by the plurality of client VMs. The computer program is also configured to cause the at least one processor to determine which of the plurality of client VMs requesting resources to allocate resources to, as well as an amount of the resources to allocate, in a given time slot based on the calculated statistical characteristics.

In another embodiment of the present invention, a computer-implemented method includes gathering resource usage statistics for a plurality of client VMs and calculating statistical characteristics of resource usage by the plurality of client VMs. The computer-implemented method also includes determining which of the plurality of client VMs requesting resources to allocate resources to, as well as an amount of the resources to allocate, in a given time slot based on the calculated statistical characteristics.

In yet another embodiment of the present invention, an apparatus includes physical memory including computer program instructions and at least one processor configured to execute the computer program instructions. The at least one processor is configured to gather resource usage statistics for a plurality of client VMs and calculate statistical characteristics of resource usage by the plurality of client VMs. The at least one processor is also configured to determine which of the plurality of client VMs requesting resources to allocate resources to, as well as an amount of the resources to allocate, in a given time slot based on the calculated statistical characteristics.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a graph illustrating resource requests over time for two clients.

FIG. 2 is a graph illustrating resource allocation over time for two clients, according to an embodiment of the present invention.

FIG. 9 is a screenshot illustrating a graphical user interface ("GUI") with information retrievable from a database, according to an embodiment of the present invention.

DETAILED DESCRIPTION OF THE EMBODIMENTS

Some embodiments of the present invention provide an improved approach to overprovisioning of resources in a virtual machine environment. In some embodiments, the resource overprovisioning may be optimal. In certain embodiments, the overprovisioning scheme works as follows.

Let M be the total resources available for the whole system. Each time a resource R≤M is assigned to a user (i.e., client) U for T timeslots, the system tracks resource usage by U and records the corresponding time series $u_1, u_2, \ldots, u_T$ for further post-processing. In this case, $u_i$ represents the amount of resources used by U at time $t_i$. It is assumed that consumed resource amounts take values $r_1=\Delta<r_2<\ldots<r_N=R$, and $r_{j+1}-r_j=\Delta$. Hence, for all i, there exists some j such that $u_i=r_j$.

From resource usage statistics gathered over time, the probability distribution function ("PDF") $f_U(r_k):=P(u=r_k)\approx|\{i: u_i=r_k\}|/T$ for the resource usage by a given client U can be known. For each client, a certain level of service should be ensured. For example, if designated resource availability is 95%, $|\{i: a_i=R\}|/T\geq 95\%$. Here, $a_i$ denotes resources available to the user U at time $t_i$. If the actual physical resources designated to U is R, then all $a_i=R$, and the grade of service will be met. In fact, the achieved resource availability in this case would be 100%.

FIG. 1 is a graph 100 illustrating resource requests over time for two clients. The total available resources are shown vertically as the distance between Client 1 and Client 2. Time progresses from left to right. Six discrete time slots $t_1, t_2, \ldots, t_6$ are shown. At each time slot, the resources allowed for Client 1 are shown in a solid line and the resources allowed for Client 2 are shown in a dashed line. The maximum resources allowed to be requested by Client 1 and Client 2 are also shown. Most of the time, the resource needs of Client 1 and Client 2 are less than the total system resources. However, at $t_3$ and $t_4$, the resource requests of both Client 1 and Client 2 cannot be met as the system has overprovisioned resources beyond the resources possessed by the system. This is shown by overlap 110, 120. In such a case, at least one client will get fewer resources than it needs at that time.

In some embodiments, the system will grant resource requests for the client with the higher resource needs and does not grant resources to the client with lesser resource needs. FIG. 2 illustrates resource allocations for the resource requests of FIG. 1 for such embodiments. For example, at $t_3$, the system will deny full requested resources to Client 2, and at $t_4$, the system will deny full requested resources to Client 1. One reason for implementing such a scheme is that the client that needs fewer resources at a given time slot will most likely be able to catch up in task performance at later time slots by requesting and receiving higher amounts of resources.

Figure 3A:
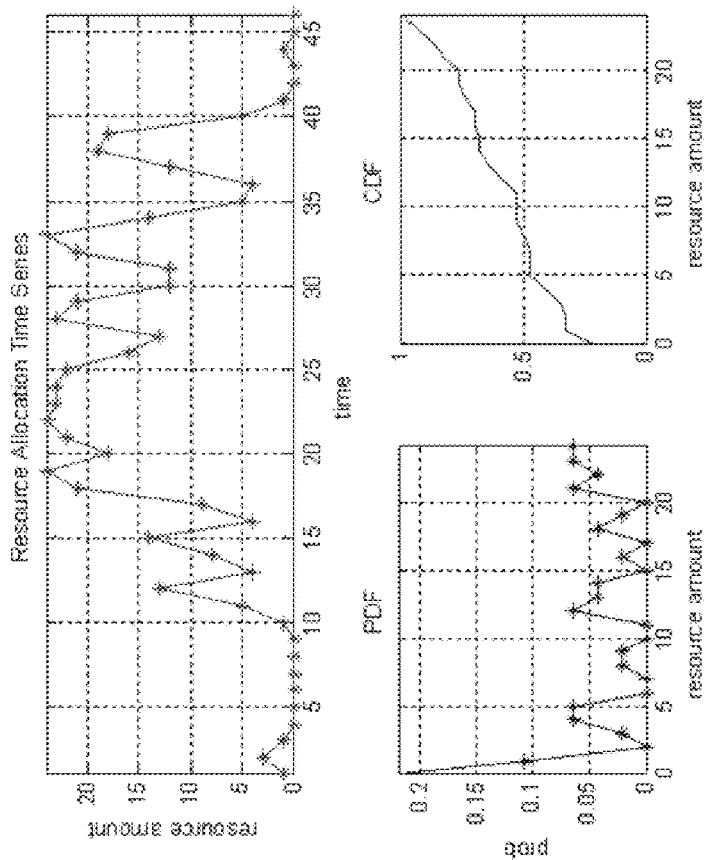
FIG. 3A is a graph illustrating the resource usage over time for Client 1, according to an embodiment of the present invention.
Figure 3B:
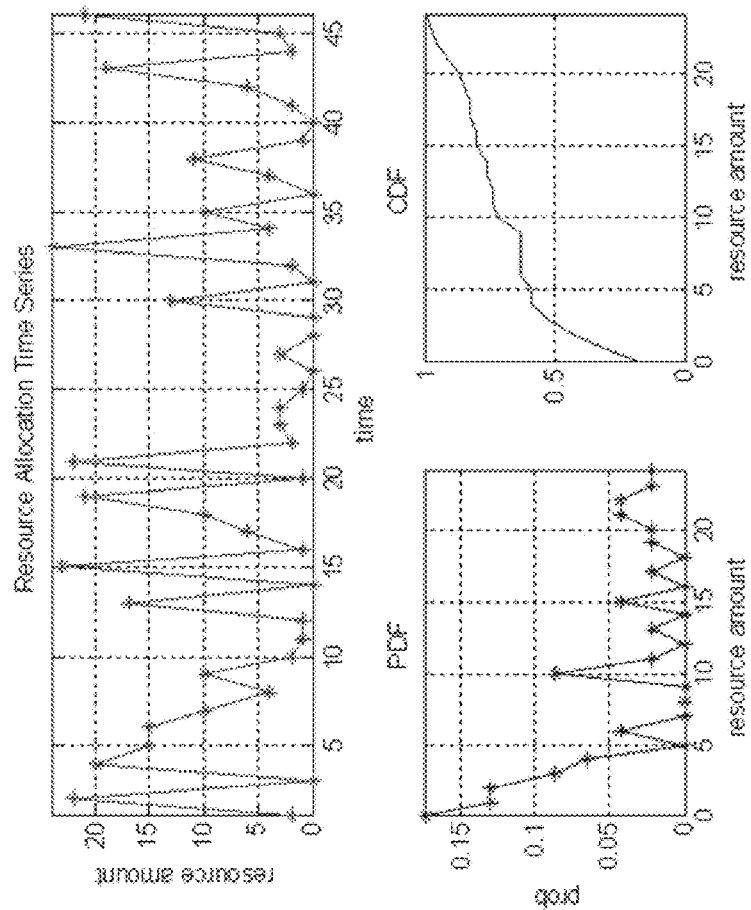
FIG. 3B is a graph illustrating the resource usage over time for Client 2, according to an embodiment of the present invention.

If both clients require R resources at time slot $t_i$, then $a_i<u_i$ and the grade of service is less than 100% for at least one of the clients. The grade of service that can be achieved can be determined by analyzing resource usage statistics for both clients. FIGS. 3A and 3B illustrate graphs 300, 310 of the resource usage over time for Client 1 and Client 2, respectively, according to an embodiment of the present invention. For the sake of simplicity, it can be assumed that both clients request the same amount of resources for the same length of time, and those resources may be scheduled to both clients at the same time.

It can be seen from FIG. 3A that Client 1 tends to have more time when few or no resources are used compared to Client 2. Suppose that both clients want to have a resource availability of 95%, as defined above. To estimate whether these requirements can be met, resource usage history should be analyzed. The following formulas help to estimate the probability of resource availability to the clients.

$$f_u(r_k) := P(u = r_k) \approx \frac{|\{i : u_i = r_k\}|}{T} \quad (1)$$

$$P(u > r) = \sum_{r_i > r} f_u(r_i) \quad (2)$$

$$P(r_k \leq u \leq r_l) = \sum_{r_k \leq r_i \leq r_l} f_u(r_i) \quad (3)$$

$$f_{u+v}(r^*) := P(u+v=r^*) = \sum_k f_u(r_k) \cdot f_v(r^* - r_k) \quad (4)$$

Let M denote the maximum hardware resources available for two users. Let $M_u$ and $M_v$ be maximum resources assigned to clients U and V, respectively. To calculate the probability of resource access blocking, Equations (1-5) may be used. Given two clients with known resource usage histories and probability distribution functions, we can select Let $M_u$ and $M_v$ (both ≤M) such that P(+v>M) is minimized. To illustrate usage of the above formula for resource provisioning, consider the example for the two clients from FIGS. 3A and 3B. In this example, two users have to share M=24 units of total hardware resources.

$$P(u+v>M) = \sum_{r=M+1}^{M_u+M_v} \sum_{k=r-M_u}^{M_v} f_v(k) \cdot f_u(r-k) \quad (5)$$

One option is to set $M_u=M_v=24$, i.e. assign all M units to each user. In such a case, the Probability Distribution Function ("PDF") of resource usage will change by increasing the frequency of instances when a higher amount of resources is utilized by each client. As is seen in FIGS. 3A and 3B, Client 1 and Client 2 more commonly do not use all 24 resource units. Therefore, the probability of all clients each requesting maximum resource units is relatively low. In this case, using Equation (5), the probability of resource access blocking is estimated to be P(u+v>24)≈26%.

Figure 4A:
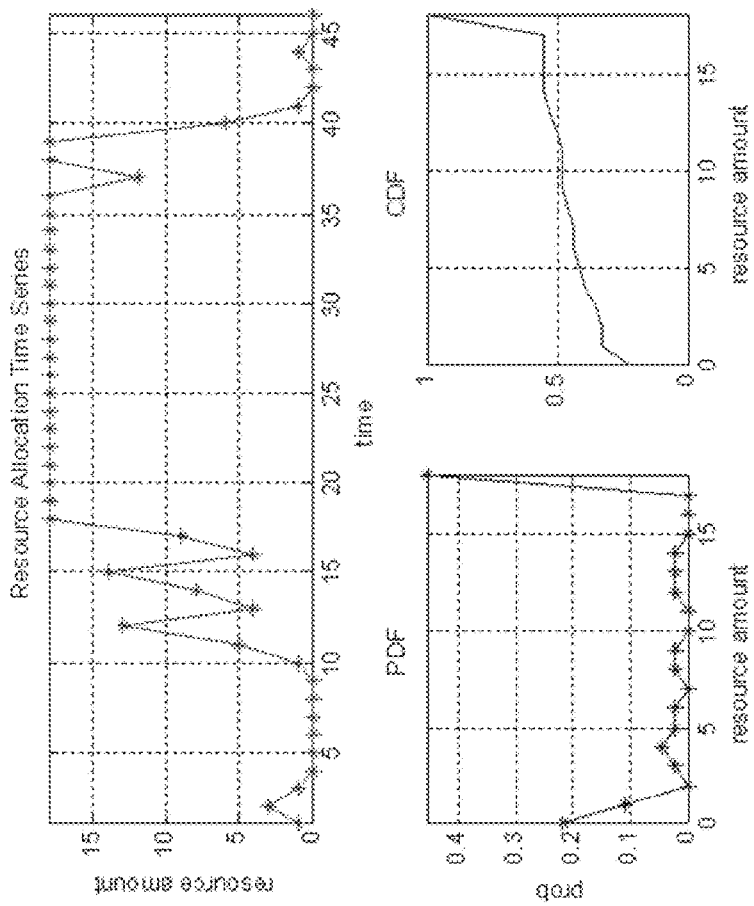
FIG. 4A is a graph illustrating resource usage data for Client 1 with M=24 and $M_u=M_v=18$, according to an embodiment of the present invention.
Figure 4B:
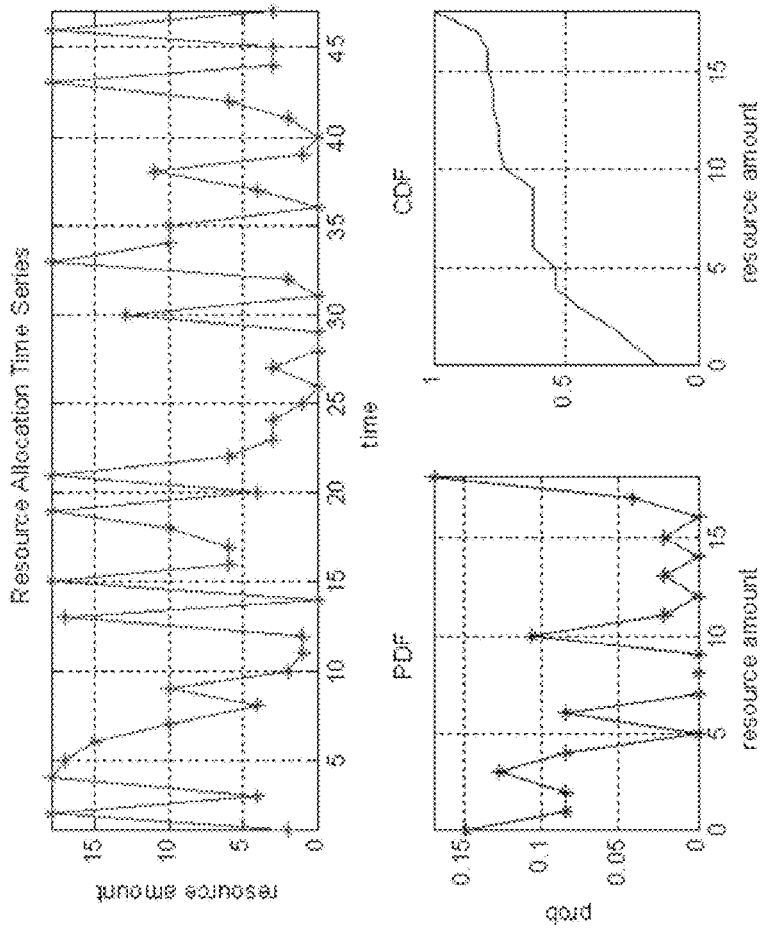
FIG. 4B is a graph illustrating resource usage data for Client 2 with M=24 and $M_u=M_v=18$, according to an embodiment of the present invention.

Another option is to assign all available resources to each client, i.e., $M_u=M_v=18$. Clients with the same configuration, but lower maximum accessible resources, will more frequently use amounts of resources that are closer to the maximum allowed. This can be seen in graphs 400, 410 for Client 1 and Client 2, respectively, in FIGS. 4A and 4B. Accordingly, the probability of both clients requesting maximum resources at the same time is relatively high. However, the cumulative probability of resource access blocking is lower in this case, with P(u+v>24)≈20%.

Figure 5A:
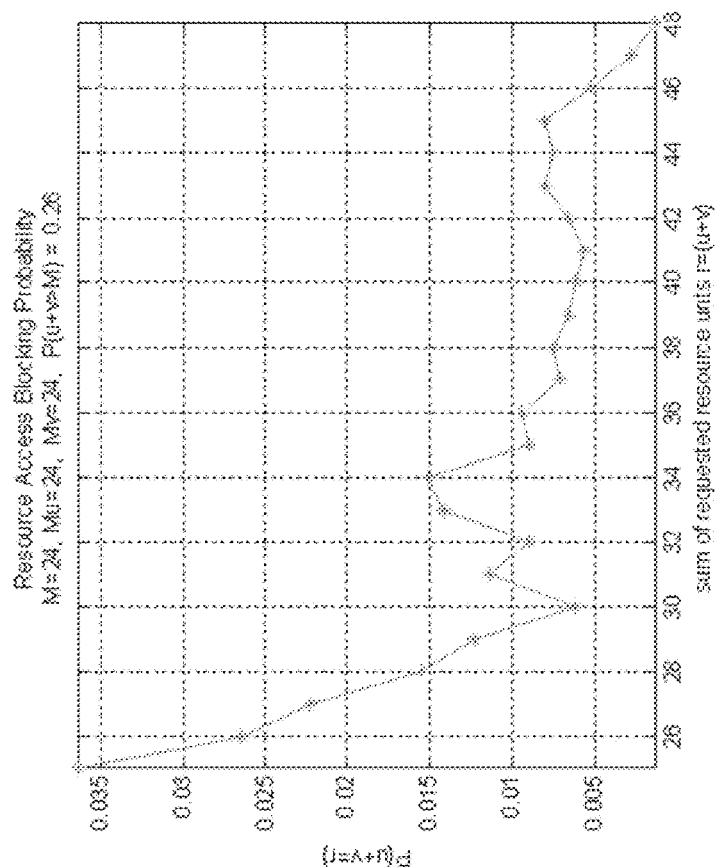
FIG. 5A is a graph illustrating joint resource usage probability for Client 1 and Client 2 as a function of requested resource units with $M_u=M_v=24$, according to an embodiment of the present invention.
Figure 5B:
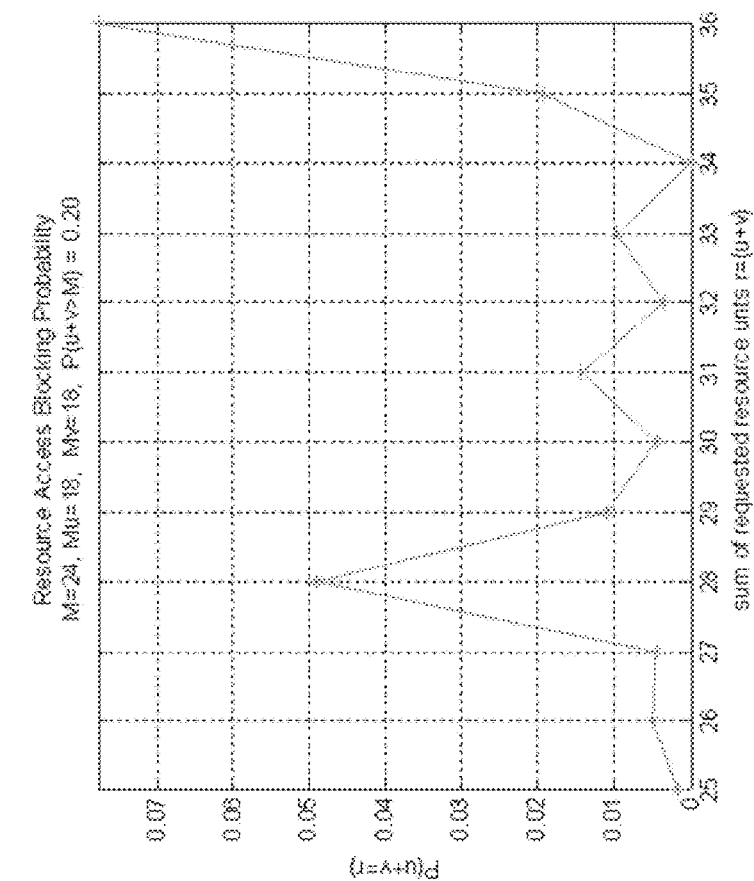
FIG. 5B is a graph illustrating joint resource usage probability for Client 1 and Client 2 as a function of requested resource units with $M_u=M_v=18$, according to an embodiment of the present invention.
Figure 6:
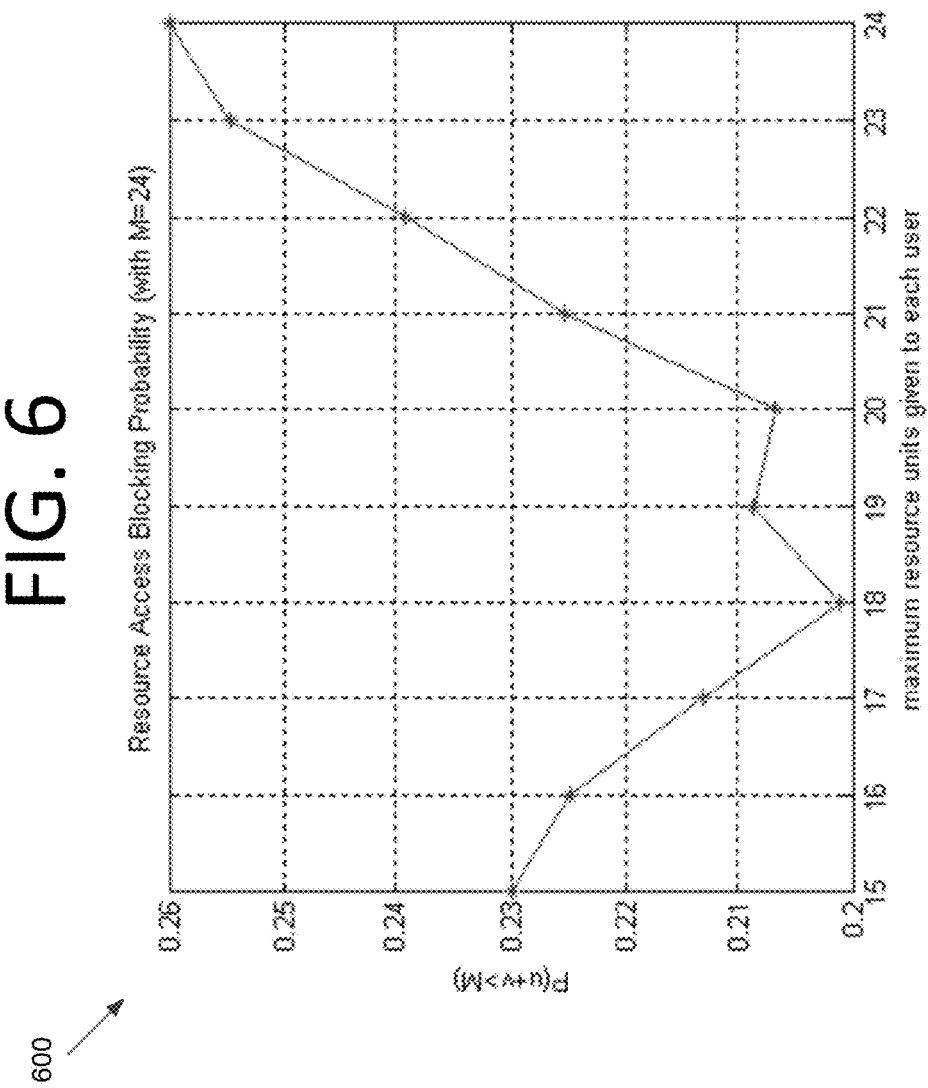
FIG. 6 illustrates cumulative resource blocking probabilities as a function of maximum resources allowed to the clients with M=24, according to an embodiment of the present invention.

This approach can be used to analyze the expected resource access blocking probability for a variety of configuration options. In particular, FIGS. 5A and 5B show graphs 500, 510 of the cumulative resource access blocking probability as a function of maximum resources allowed to the users with $M_u=M_v=24$ and $M_u=M_v=18$, respectively. FIG. 6 is a graph 600 plotting P(u+v>M) against maximum resource units given to each client with M=24 for the case with two clients. It can be seen that the case when 18 resource units are allowed per user is optimal. Therefore, among the two presented over-provisioning options, the latter option should be selected. As resource access denial is split between the two clients, each client will have approximately 90% availability for all hardware resources.

The approach described above is not limited to resource provisioning of just two clients, and can readily be extended to any number of clients. In general, the approach can be used for decision making process of whether a new client should be given any resources. The methodology is the same as described above. When all clients with given resources are considered as one client (statistics of their resource usage can be combined), a decision can be made on optimal resource allocation based on analysis of cumulative resource access blocking probability as described earlier.

Figure 7:
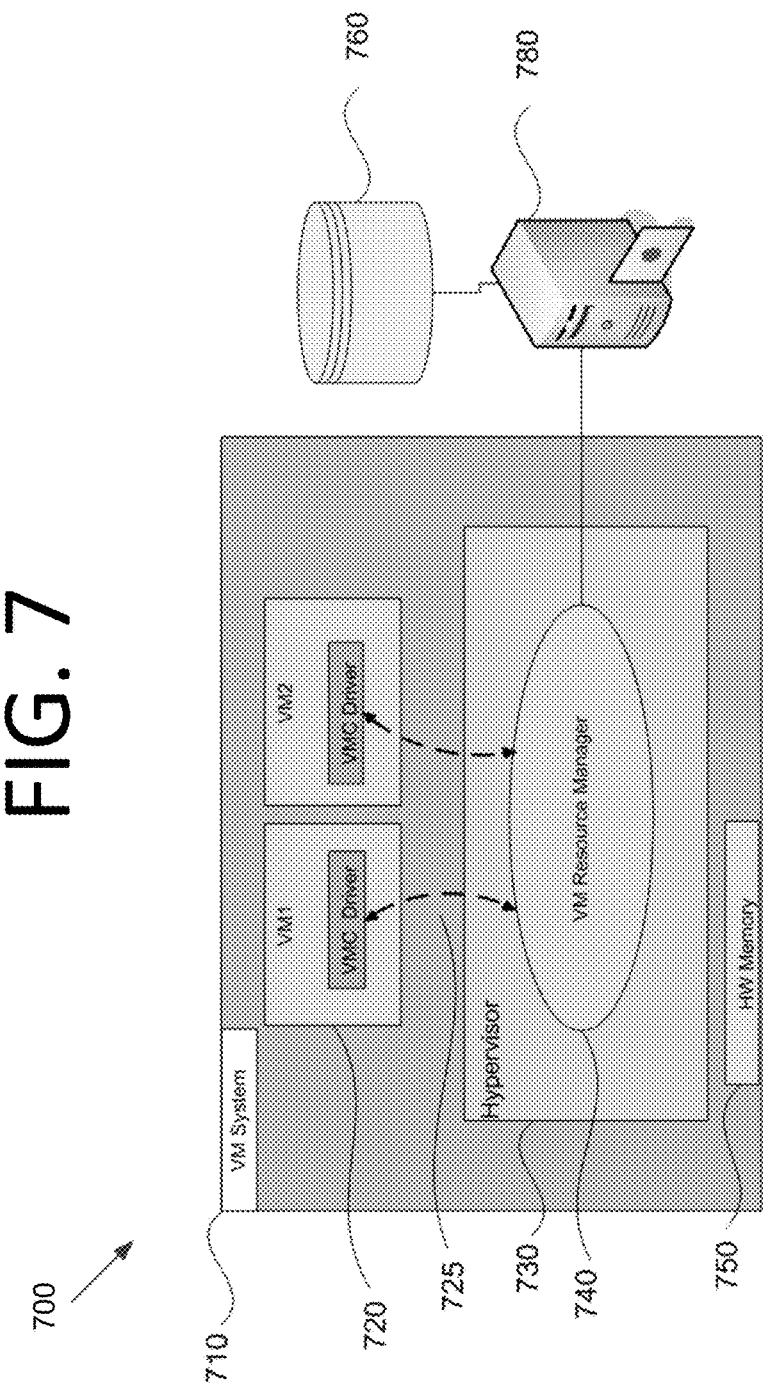
FIG. 7 illustrates an architecture for a virtual machine system with a resource overprovisioning support infrastructure, according to an embodiment of the present invention.

FIG. 7 illustrates an architecture 700 for a virtual machine ("VM") system 710 with a resource overprovisioning support infrastructure, according to an embodiment of the present invention. VM system 710 may be of native hypervisor type, although VM system 710 could be any other suitable type (e.g., hosted VM system type). Hypervisor 730 is responsible for distributing hardware ("HW") memory 750 and other resources among client VMs, such as VM1 720, and the function responsible for resource distribution within hypervisor 730 is VM resource manager 740. VM resource manager 740 determines the amount of the total HW resources to be assigned to each client VM. The method of resource allocation decision process is discussed in more detail below with respect to FIG. 8.

Each client VM, such as VM1 720, has a respective VM connection ("VMC") driver, which has a private communication channel 725 for informing VM resource manager 740 of resource usage by its VM. During operation of each client VM, VM resource manager 740 collects information provided by each VMC driver regarding memory resource usage. Once accumulated, this information is sent to processing unit 780, which calculates and/or updates statistical characteristics of resource usage by the corresponding client VM and saves the updated information in database 760. This information may then be retrieved and used by VM resource manager 740 for evaluating optimal resource allocation, as described in more detail below.

Figure 8:
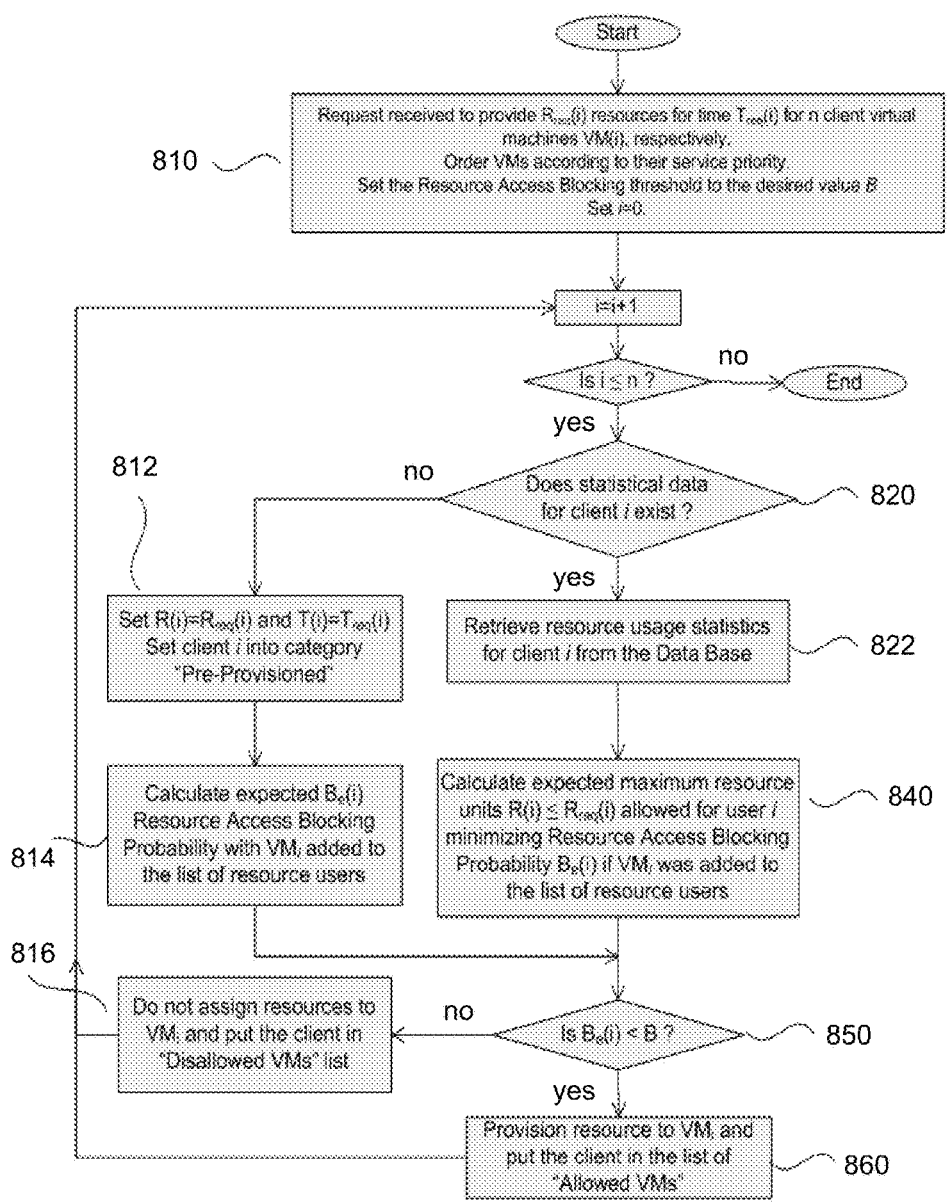
FIG. 8 is a flowchart 800 illustrating the main resource overprovisioning loop, according to an embodiment of the present invention.

FIG. 8 is a flowchart 800 illustrating the main resource overprovisioning loop, according to an embodiment of the present invention. In some embodiments, the resource allocation process of FIG. 8 may be implemented by a system having architecture 700 of FIG. 7. One of the functions of a VM resource manager is to determine which of the clients requesting resources will actually be given resources, as well as the amount of resources to allocate. In FIG. 8, it is assumed that n clients <VM1, . . . , VMn> would like to reserve resources <Rreq(1), . . . , Rreq(n)> for time <Treq(1), . . . , Treq(n)>. For each client that will be given resources, the VM system will launch a client VM with allowed resources and let the client use the resources for the allowed time. In this example, for the sake of simplicity, it is assumed that the clients are ordered in increasing priority, i.e., client i is served, if possible, before client i+1 is served. Served here means resources are allocated for the client. The method also assumes that a client-desired resource access blocking probability will be provided to the algorithm as an input (see step 810).

The main loop of the algorithm then checks whether each client can be given resources without violating the maximum allowed resource access blocking probability B. By retrieving each client's resource usage statistics from a database, the VM resource manager will identify for each client whether the client has a resource usage history (step 820). If no resource usage history is available, the system will pre-assign to the user the requested resources for the requested time (step 812) and calculate the expected resource access blocking probability Be(i) if the clients 1, 2, . . . , i were allowed to use the pre-assigned resources (step 814).

Otherwise, resource usage statistics in the form of a resource access PDF will be retrieved from the database (step 822) and the expected maximum resource units R(i) ≤Rreq(i) allowed for client i that minimizes resource access blocking probability Be(i) will be calculated if client i (in addition to clients 1, 2, . . . , i–1) was added to the list of resource users (step 840). Note that calculations of Be(i) in steps 814 and 840 were described generally in previous sections of this disclosure and will be discussed in more detail below. If the expected resource access blocking probability Be(i) is below the maximum allowed value B (step 850), client i will be allowed to use pre-assigned resources (step 860), and VMi will be placed in the list of allowed client VMs. Otherwise, client i will not be given resources.

Figure 9:
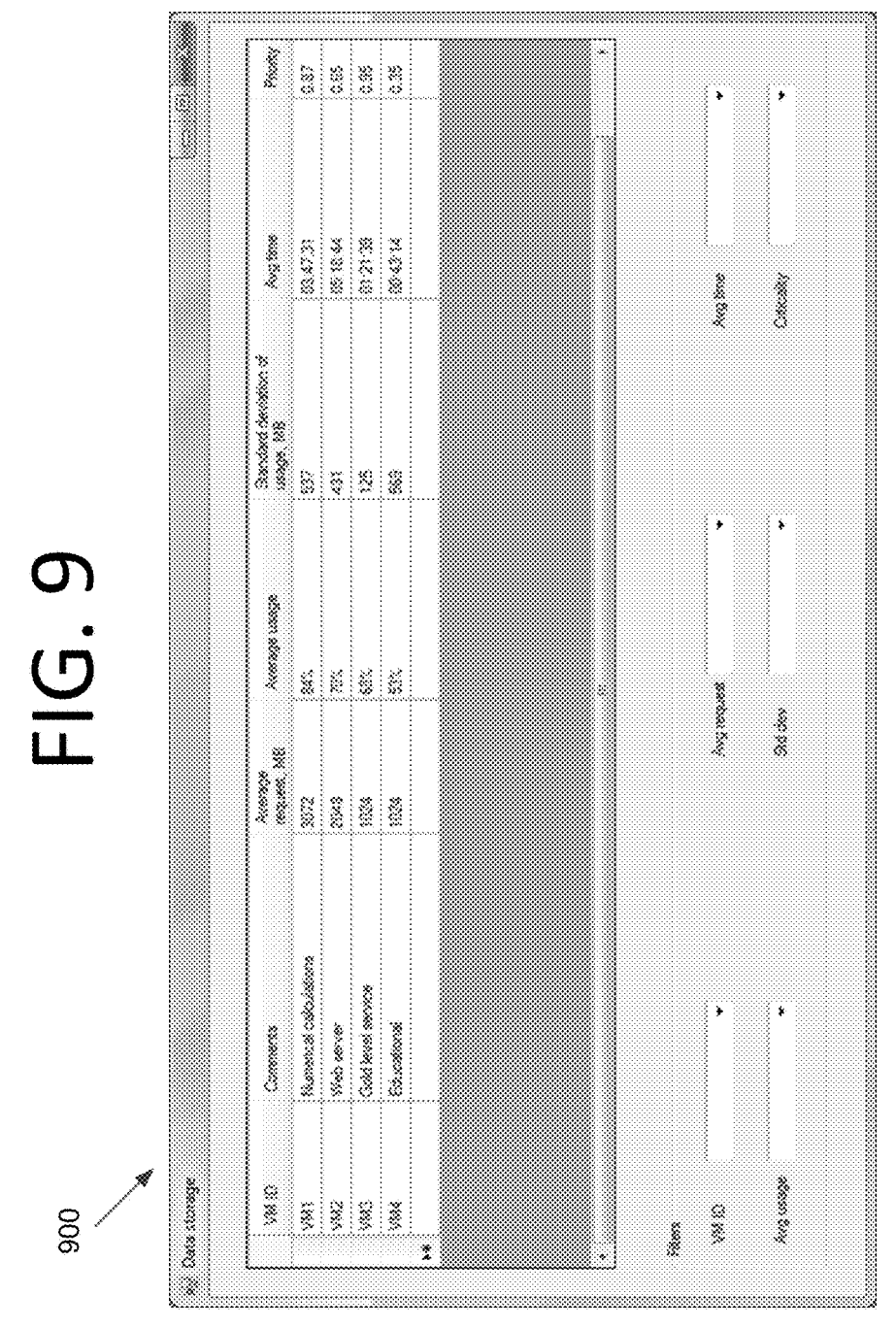

FIG. 9 is a screenshot 900 illustrating a GUI with information retrievable from a database, according to an embodiment of the present invention. In some embodiments, the database may be database 760 of FIG. 7. For each client (clients are denoted VM1, VM2, etc.), the system has access to average requested memory, average memory actually used, standard deviation of memory usage, and average time when the requested resources were used. User priorities can be calculated or entered manually.

Figure 10:
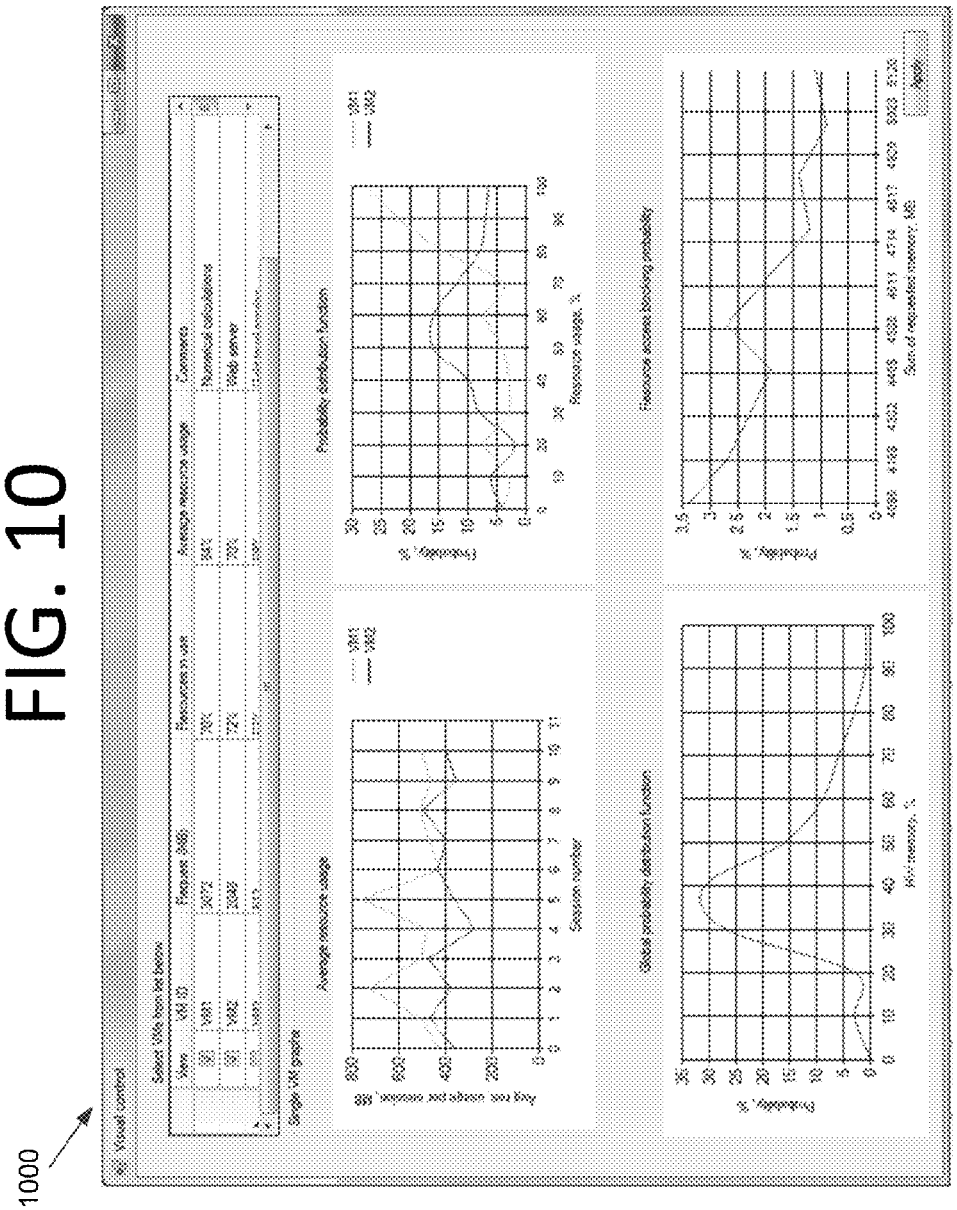
FIG. 10 is a screenshot illustrating expected system performance for allocating resources to two client virtual machines, according to an embodiment of the present invention.

FIG. 10 is a screenshot 1000 illustrating expected system performance for allocating resources to two client VMs, according to an embodiment of the present invention. The system user can also select a specific client and play "what if" scenarios for giving resources to certain clients. FIG. 10 shows one such scenario. In this example, the system user can see what could be expected if only two clients were given resources for their respective client VMs: VM1 and VM2. VM1 has a maximum requested memory of 3 GB and VM2 is requesting 2 GB. If both VMs were to run simultaneously, the maximum total memory in use could reach 5 GB, and based on previous history of memory usage by these clients, probability of this happening is zero (see the lower graph on the right).

Figure 11:
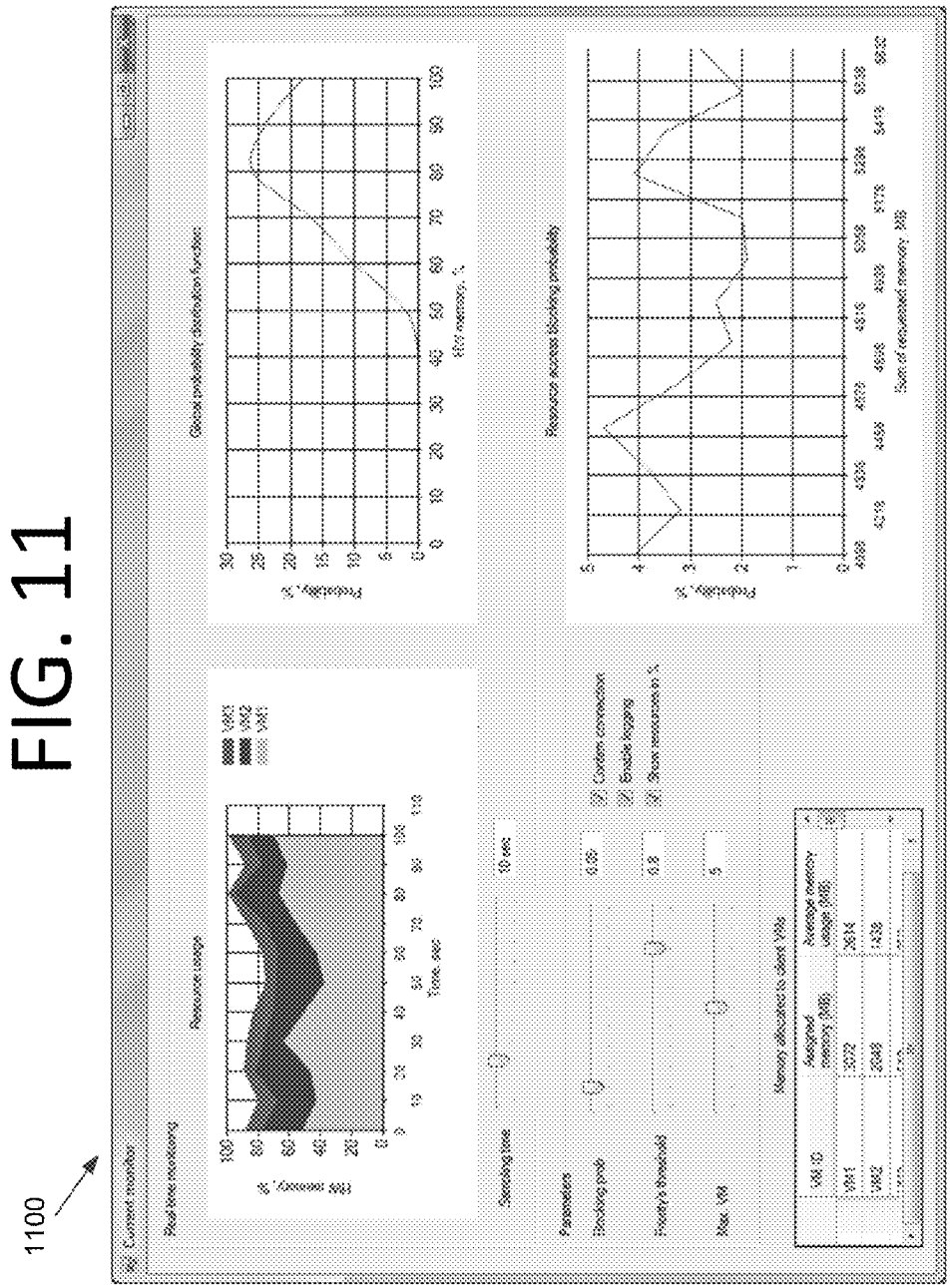
FIG. 11 is a screenshot illustrating system performance monitoring capabilities, according to an embodiment of the present invention.

Once the allowed users are selected, the system will create a VM for each user/client, pre-calculated (and typically overprovisioned) resources are assigned and each task is run for the designated time. Referring to FIG. 7, during that time, VM resource manager 740 will periodically receive resource usage information from each client VM, such as VM1 720. This information is sent by the corresponding VMC diver (residing inside each VM) via respective private communication channel 725. This information is further passed to processing server 780, and continuously updated statistical resource usage information is stored in database 760. At the same time, the system may allow the operator to monitor system performance in near real-time. FIG. 11 is a screenshot 1100 illustrating an example of system performance monitoring capabilities.

Figure 12:
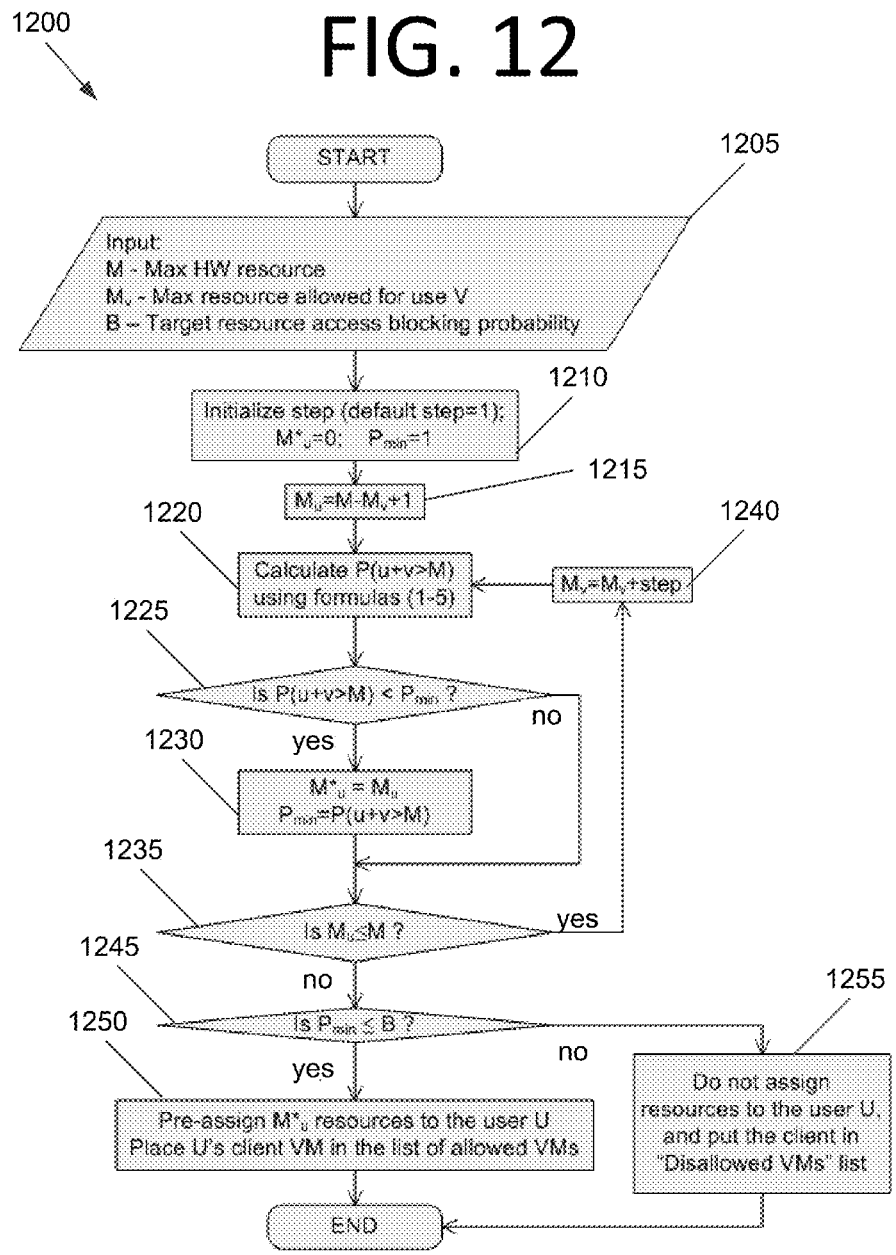
FIG. 12 is a flowchart illustrating a method for calculating allowed resources with overprovisioning, according to an embodiment of the present invention.

FIG. 12 is a flowchart 1200 illustrating a method for calculating allowed resources with overprovisioning, according to an embodiment of the present invention. This is a similar but alternative version of the algorithm that runs in steps 840, 850, 816, and 860 in the main loop shown in FIG. 8. In this example, it is assumed that user V is already admitted in the list of users whose VM request will be granted, and the maximum allowed resources for this user is $M_v$. The maximum hardware resources M and allowed resource access blocking B are also known (see step 1205). Resource values $M^*_u$ are sought that will minimize the resource access blocking probability if the VM for user U was allowed.

The default step is initialized to 1, $M^*_u$ is set to 0, and $P_{min}$ is set to 1 (step 1210). $M_u$ is set to $M-M_v+1$ (step 1215). $P(u+v>M)$ is calculated using Equations (1-5) discussed above (step 1220). If $P(u+V>M)<P_{min}$ (step 1225), $M^*_u$ is set to $M_u$ and $P_{min}$ is set to $P(u+v>M)$ (step 1230).

If $M_u \le M$ (step 1235), $M_v$ is set to $M_v$+step (step 1240). Otherwise, the system checks whether $P_{min} \le B$ (step 1245). If yes, $M^*_u$ resources are pre-assigned to user U and the client VM for U is placed in the list of allowed VMs (step 1250). Otherwise, resources are not assigned to U and the client is placed in a "disallowed VMs" list (step 1255). The process then ends.

A person of ordinary skill in the art will recognize that the methods described herein can be modified for finding $M_u$ using different criteria of optimality. For example, one could search for the maximum $M^*_u$ not exceeding M, as long as the resource access blocking probability is below B. In fact, such criteria are listed in step 840 in FIG. 8.

Another aspect of some embodiments is that they can be applied to more than two users. Indeed, it can be assumed that in the discussion presented above, V represents multiple users whose VMs are deemed to be allowed. The corresponding statistical information can be generated by combining individual user's statistical information stored in a database. The methods could further distinguish between users with correlated and uncorrelated resource usage statistics.

Figure 13:
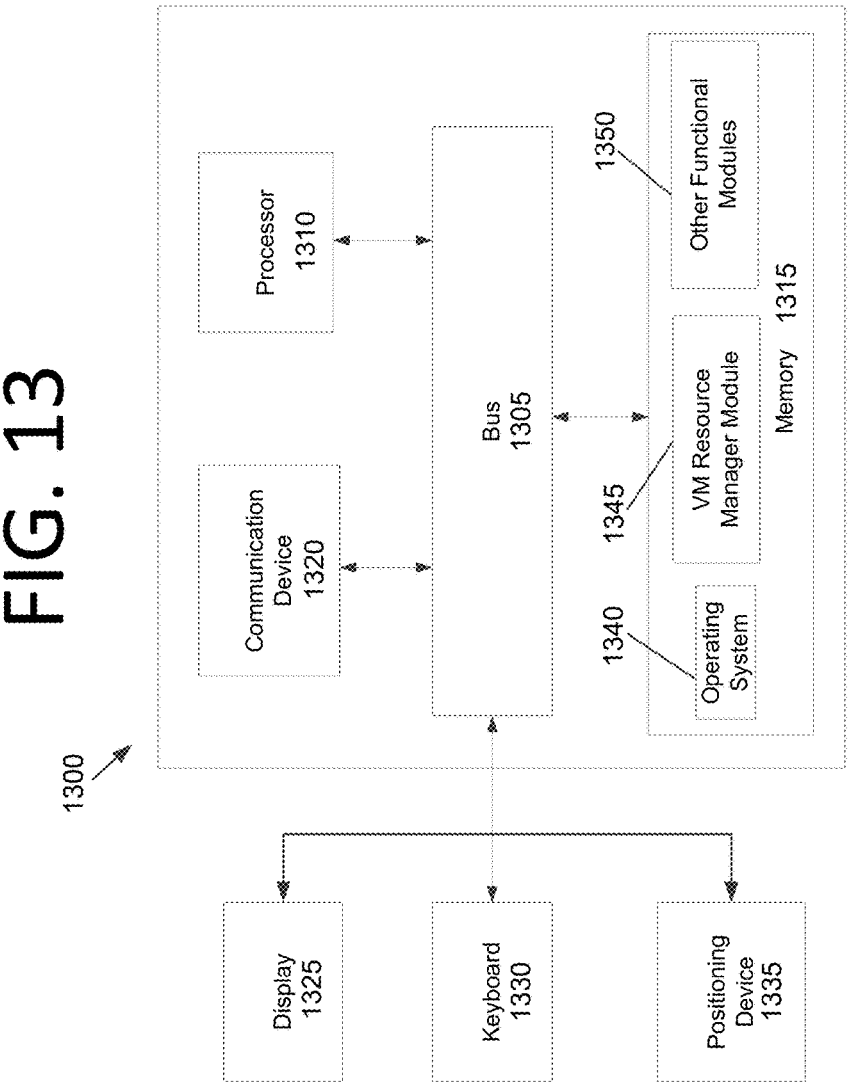
FIG. 13 illustrates a computing system for overprovisioning resources, according to an embodiment of the present invention.

FIG. 13 illustrates a computing system 1300 for overprovisioning resources, according to an embodiment of the present invention. System 1300 includes a bus 1305 or other communication mechanism for communicating information, and a processor 1310 coupled to bus 1305 for processing information. Processor 1310 may be any type of general or specific purpose processor, including a central processing unit ("CPU") or application specific integrated circuit ("ASIC"). System 1300 further includes a memory 1315 for storing information and instructions to be executed by processor 1310. Memory 1315 can be comprised of any combination of random access memory ("RAM"), read only memory ("ROM"), flash memory, cache, static storage such as a magnetic or optical disk, or any other types of non-transitory computer-readable media or combinations thereof. Additionally, system 1300 includes a communication device 1320, such as a wireless network interface card, to provide access to a network.

Non-transitory computer-readable media may be any available media that can be accessed by processor 1310 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 1310 is further coupled via bus 1305 to a display 1325, such as a Liquid Crystal Display ("LCD"), for displaying information to a user. A keyboard 1330 and a positioning device 1335, such as a computer mouse, a touch pad, a joy stick, directional arrow buttons, or any other suitable positioning mechanism, are further coupled to bus 1305 to enable a user to interface with system 1300. Any type and combination of input devices may be used as a matter of design choice.

In one embodiment, memory 1315 stores software modules that provide functionality when executed by processor 1310. The modules include an operating system 1340 for system 1300. The modules further include a VM resource manager module 1345 that is configured to control and manage memory allocation for a plurality of VMs. System 1300 may include one or more additional functional modules 1350 that include additional functionality, such as implementing VMs.

One skilled in the art will appreciate that a "system" could be embodied as a personal computer, a server, a console, a personal digital assistant ("PDA"), a cell phone, a tablet computing device, a television, a DVD player, an A/N device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 8 and 12 may be performed by a computer program, encoding instructions for the nonlinear adaptive processor to perform at least the methods described in FIGS. 8 and 12, in accordance with an embodiment of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 8 and 12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of various embodiments of the present invention, as generally described and illustrated in the figures herein, may be arranged and designed in a wide variety of different configurations. Thus, the detailed description of the embodiments of the systems, apparatuses and methods of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable storage medium, the computer program configured to cause at least one processor to:
   determine statistical characteristics of resource usage by a plurality of client virtual machines ("VMs"); and determine which of the plurality of client VMs requesting resources to allocate resources to, as well as an amount of the resources to allocate, in a given time slot based on the determined statistical characteristics;

wherein the computer program is further configured to cause the at least one processor to pre-assign requested resources to a client VM for a requested time and determine an expected resource access blocking probability as though other client VMs were allowed to use the pre-assigned resources when no resource usage history is available for the client VM.

2. The computer program of claim 1, wherein the plurality of client VMs are ordered in increasing priority such that the resources are allocated for higher priority client VMs before lower priority client VMs.

3. The computer program of claim 1, wherein the computer program is further configured to cause the at least one processor to receive a maximum allowed resource access blocking probability as input.

4. The computer program of claim 3, wherein the computer program is further configured to cause the at least one processor to check whether each client VM can be allocated resources without violating the maximum allowed resource access blocking probability.

5. The computer program of claim 1, wherein the computer program is further configured to cause the at least one processor to overprovision resources to client VMs beyond resources possessed and thereafter resolve conflicts of the client VMs for overprovisioned resources via at least one of a plurality of methods.

6. The computer program of claim 1, wherein the computer program is further configured to cause the at least one processor to access resource usage statistics in the form of a resource access probability distribution function and determine an expected number of maximum resource units allowed for a client VM that minimizes a resource access blocking probability when the client VM was added to a list of resource users.

7. The computer program of claim 1, wherein the computer program is further configured to cause the processor to allow a client VM to use pre-assigned resources and place the client VM in a list of allowed client VMs when an expected resource access blocking probability is below a maximum allowed value, and the client VM is not given the pre-assigned resources otherwise.

8. A computer-implemented method, comprising:
determining, by the computing system, statistical characteristics of resource usage by plurality of client virtual machines ("VMs");
determining, by the computing system, which of the plurality of client VMs requesting resources to allocate resources to, as well as an amount of the resources to allocate, in a given time slot based on the determined statistical characteristics; and
pre-assigning, by the computing system, requested resources to a client VM for a requested time and determining an expected resource access blocking probability as though other client VMs were allowed to use the pre-assigned resources when no resource usage history is available for the client VM.

9. The computer-implemented method of claim 8, further comprising:
receiving, by the computing system, a maximum allowed resource access blocking probability as input.

10. The computer-implemented method of claim 9, further comprising:

checking, by the computing system, whether each client VM can be allocated resources without violating the maximum allowed resource access blocking probability.

11. The computer-implemented method of claim 8, further comprising:
overprovisioning resources to client VMs beyond resources possessed and thereafter resolve conflicts of the client VMs for overprovisioned resources via at least one of a plurality of methods.

12. The computer-implemented method of claim 8, further comprising:
accessing, by the computing system, resource usage statistics in the form of a resource access probability distribution function and determining an expected number of maximum resource units allowed for a client VM that minimizes a resource access blocking probability when the client VM was added to a list of resource users.

13. The computer-implemented method of claim 8, further comprising:
allowing, by the computing system, a client VM to use pre-assigned resources and placing the client VM in a list of allowed client VMs when an expected resource access blocking probability is below a maximum allowed value, and the client VM is not given the pre-assigned resources otherwise.

14. An apparatus, comprising:
physical memory comprising computer program instructions;
at least one processor configured to execute the computer program instructions, the at least one processor configured to:
determine statistical characteristics of resource usage by plurality of client virtual machines ("VMs"),
determine which of the plurality of client VMs requesting resources to allocate resources to, as well as an amount of the resources to allocate, in a given time slot based on the determined statistical characteristics, and
pre-assign requested resources to a client VM for a requested time and determine an expected resource access blocking probability as though other client VMs were allowed to use the pre-assigned resources when no resource usage history is available for the client VM.

15. The apparatus of claim 14, wherein the at least one processor is further configured to receive a maximum allowed resource access blocking probability as input.

16. The apparatus of claim 15, wherein the at least one processor is further configured to check whether each client VM can be allocated resources without violating the maximum allowed resource access blocking probability.

17. The apparatus of claim 14, wherein the at least one processor is further configured to overprovision resources to client VMs beyond resources possessed and thereafter resolve conflicts of the client VMs for overprovisioned resources via at least one of a plurality of methods.

18. The apparatus of claim 14, wherein the processor is further configured to access resource usage statistics in the form of a resource access probability distribution function and determine an expected number of maximum resource units allowed for a client VM that minimizes a resource access blocking probability when the client VM was added to a list of resource users.

19. The apparatus of claim 14, wherein the at least one processor is further configured to allow a client VM to use pre-assigned resources and place the client VM in a list of allowed client VMs when an expected resource access blocking probability is below a maximum allowed value, and the client VM is not given the pre-assigned resources otherwise.

20. The apparatus of claim 14, wherein the plurality of client VMs are ordered in increasing priority such that resources are allocated for higher priority client VMs before lower priority client VMs.

\* \* \* \* \*